United States Patent
Sakamoto

(10) Patent No.: US 7,035,019 B2
(45) Date of Patent: Apr. 25, 2006

(54) LENS BARREL EXTENDING AND RETRACTING MECHANISMS

(75) Inventor: Takamasa Sakamoto, Osaka (JP)

(73) Assignees: Asia Optical Co., Inc., Taichung (TW); Optek Corporation, Osaka (JP)

( * ) Notice: Subject to any disclaimer, the term of this patent is extended or adjusted under 35 U.S.C. 154(b) by 0 days.

(21) Appl. No.: 11/015,603

(22) Filed: Dec. 17, 2004

(65) Prior Publication Data

US 2005/0254144 A1 Nov. 17, 2005

(30) Foreign Application Priority Data

May 14, 2004 (JP) ............................. 2004-144642

(51) Int. Cl.
*G02B 15/14* (2006.01)
*G03B 17/00* (2006.01)
*G03B 13/30* (2006.01)
*G03B 13/00* (2006.01)

(52) U.S. Cl. .................. 359/700; 359/694; 359/698; 359/699; 359/701; 396/72; 396/73; 396/75; 396/97; 396/147; 396/529; 348/357

(58) Field of Classification Search ............... 359/823, 359/825, 826, 704, 694–701; 396/72, 73, 396/75, 85, 97, 149, 349, 350, 529; 348/357, 348/335, 375
See application file for complete search history.

(56) References Cited

U.S. PATENT DOCUMENTS

| | | | | |
|---|---|---|---|---|
| 2,514,239 A * | 7/1950 | Hopkins | ..................... | 359/688 |
| 2,949,836 A * | 8/1960 | Baab | ......................... | 396/147 |
| 3,090,282 A * | 5/1963 | Angenieux | .................. | 359/823 |
| 3,329,075 A * | 7/1967 | Padelt | ....................... | 359/825 |
| 5,812,325 A * | 9/1998 | Nomura et al. | ............. | 359/700 |
| 6,122,116 A * | 9/2000 | Uno | ........................... | 359/826 |
| 6,264,380 B1 * | 7/2001 | Omiya | ...................... | 396/448 |
| 6,469,841 B1 * | 10/2002 | Nomura et al. | ............. | 359/699 |
| 6,657,794 B1 * | 12/2003 | Nomura et al. | ............. | 359/699 |
| 6,778,334 B1 * | 8/2004 | Nomura et al. | ............. | 359/701 |
| 6,952,526 B1 * | 10/2005 | Nomura | ...................... | 396/73 |
| 6,959,148 B1 * | 10/2005 | Nomura | ...................... | 396/73 |
| 6,978,088 B1 * | 12/2005 | Nomura | ...................... | 396/73 |

FOREIGN PATENT DOCUMENTS

| | | |
|---|---|---|
| JP | 2003-315861 | 6/2003 |
| JP | 2004-085934 | 3/2004 |

* cited by examiner

*Primary Examiner*—Loha Ben
(74) *Attorney, Agent, or Firm*—Thomas, Kayden, Horstemeyer & Risley

(57) ABSTRACT

A lens barrel extending and retracting mechanism. A photographic optical axis and a central axis of a lens barrel are eccentric such that a first lens group and a second lens group are housed in a side of a CCD separated from the optical axis. The lens barrel is rotatably extended around the central axis thereof, and a picture is taken when lens optical axes of the first lens group and the second lens group coincide with the optical axis. The lens barrel extending and retracting mechanism prevents displacement and tilt of the lens optical axes of the first lens group and the second lens group, maintaining optical performance and reducing the size of the lens barrel in the housed position.

8 Claims, 23 Drawing Sheets

LENS BARREL EXTENDING AND RETRACTING MECHANISMS

BACKGROUND

The invention relates to lens barrel extending and retracting mechanisms, and in particular to slim-sized lens barrel extending and retracting mechanisms with a zoom lens having a housed position and a photographic position.

The size of cameras is increasingly required to be more slim and thin. A thin and compact camera particularly in size is demand for those traveling light. Thus, in order to provide a slimmer design, the size of lens barrel units must be reduced. The size of most conventional cameras is reduced by decreasing the gap between the lens group and photographing device when the camera is not in use by housing the lens barrel in the body thereof.

Japan patent No. 2003-315861 discloses a collapsible lens barrel and method for collapsing a lens barrel. A part of a lens group in the housed position is retracted from a photographing optical axis. A second lens group is retracted from the object side and housed in a camera body.

Japan patent No. 2004-85934 discloses an extending cam mechanism for a zoom lens barrel, which not only limits the extent of movement of lenses and movement precision but also makes a cam ring small-sized.

Although the size of the lens barrel is reduced, the optical performance should be maintained as well. In a conventional zoom digital camera, an optical photography system typically comprises three lens groups. Zooming and retracting are performed by moving each lens group in the direction of the photographic optical axis. Deviation of the photographic optical axes of the lens groups, particularly deviation of the photographic optical axes of the first lens group and the second lens group from the object side, and relative tilt of the photographic optical axes of the first lens group and the second lens group may greatly affect optical performance of the camera. In both Japan patent No. 2003-315861 and No. 2004-85934, since only the second lens group is retracted via individual retracting mechanism, the lens groups may be tilted and eccentric in parallel such that optical performance is difficult to maintain.

SUMMARY

An extending and retracting mechanism for retracting and housing the lens groups while maintaining relative positions and optical performance thereof is provided to reduce the size thereof.

A lens barrel extending and retracting mechanism is provided. The lens barrel extending and retracting mechanism, for extending an optical photography system out of an electronic device and retracting the optical photography system therein, comprises a fixing barrel, a rotary barrel, a guiding barrel, and a driving mechanism. The fixing barrel comprises a first cam groove and a second cam groove formed on an inner circumference thereof. The rotary barrel comprises a first cam-follower formed on an outer circumference thereof and engaged with the first cam grooves of the fixing barrel, rotating about a central axis parallel to an optical axis of an optical photography system. The guiding barrel comprises a second cam-follower formed on an outer circumference thereof and rotatably supported with respect to the rotary barrel to maintain a portion of the optical photography system. The driving mechanism turns the rotary barrel such that the guiding barrel rotates about the central axis and moves along the central axis.

The second cam groove has a first linear trench engaging the second cam-follower so as to move the guiding barrel along the central axis when the portion of the optical photography system is out of the optical axis.

The second cam groove has a second linear trench engaging the second cam-follower so as to moving the guiding barrel along the central axis when the portion of the optical photography system is positioned along the optical axis.

The first and second cam grooves of the fixing barrel are formed without intersecting each other.

The first and second cam grooves of the fixing barrel share the same cam loci and have different depths.

The rotary barrel further comprises a protrusion, engaged with the first cam groove of the fixing barrel and disposed in the vicinity of the first cam-follower.

The portion of the optical photography system is positioned along the optical axis so as to perform zooming by rotating the rotary barrel.

The guiding barrel supports the portion of the optical photography system, and the optical photography system comprises a first lens groups and a second lens groups from the object side.

The guiding barrel maintaining the optical photographic system can rotate via the rotary barrel and extend in the rotary shaft direction or both. For example, the lens housed in a lateral side of a photographic device can be rotated and extended and positioned on the front side thereof. Thus, when taking a picture, the lens on the front side can be housed in the lateral side of the photographic device. Thus, the lens barrel can become miniaturized when retracted.

Since the lens is located in the lateral side thereof, the lens does not interfere with other elements of the photographic device such that the lens can rotate in the optical axial direction after the optical photographic system is extended out, and the gap surrounding the optical photographic system can be minimized, providing a compact-sized lens barrel.

In the photographing position, the optical photographic system moves linearly in the optical axial direction such that rotational direction of the guiding barrel can be eliminated. The optical photographic system can be designed in the front side of the photographic device to maintain optical performance.

The cam grooves do not intersect each other such that the cam-followers do not deviate and separate from the cam grooves, thus, irregular motion is avoided.

The cam grooves of the rotary barrel and those of the guiding barrel share the same cam loci with different depths such that the cam-followers can be guided, preventing separation therefrom. If the cam grooves of the rotary barrel and the guiding barrel have cam loci that are partially overlapped, the range of the cam grooves of the fixing barrel can be expanded. Thus, the degree of freedom is increased.

Separation of the cam-followers from the cam grooves of the overlapped region of the rotary barrel and the guiding barrel can be prevented to avoid loading variation. Thus, the rotary barrel and the guiding barrel can be operated smoothly.

After the rotary barrel rotates from a housed position to a photographing position and moves the optical photography system, focus can be performed by continuously rotating the rotary barrel such that retracting and zooming are easy to control.

The relative position of the first lens group and the second lens group, at the object side where optical performance influence is significant, can be maintained, and the lens groups can be retracted and housed while maintaining optical performance of the lens barrel, and size is reduced.

DESCRIPTION OF THE DRAWINGS

The invention can be more fully understood by reading the subsequent detailed description in conjunction with the examples and references made to the accompanying drawings, wherein.

DETAILED DESCRIPTION

FIGS. 1 to 21 are schematic views of an embodiment of a lens barrel. The embodiment is applicable in a zoom lens barrel of a digital camera.

Figure 1:
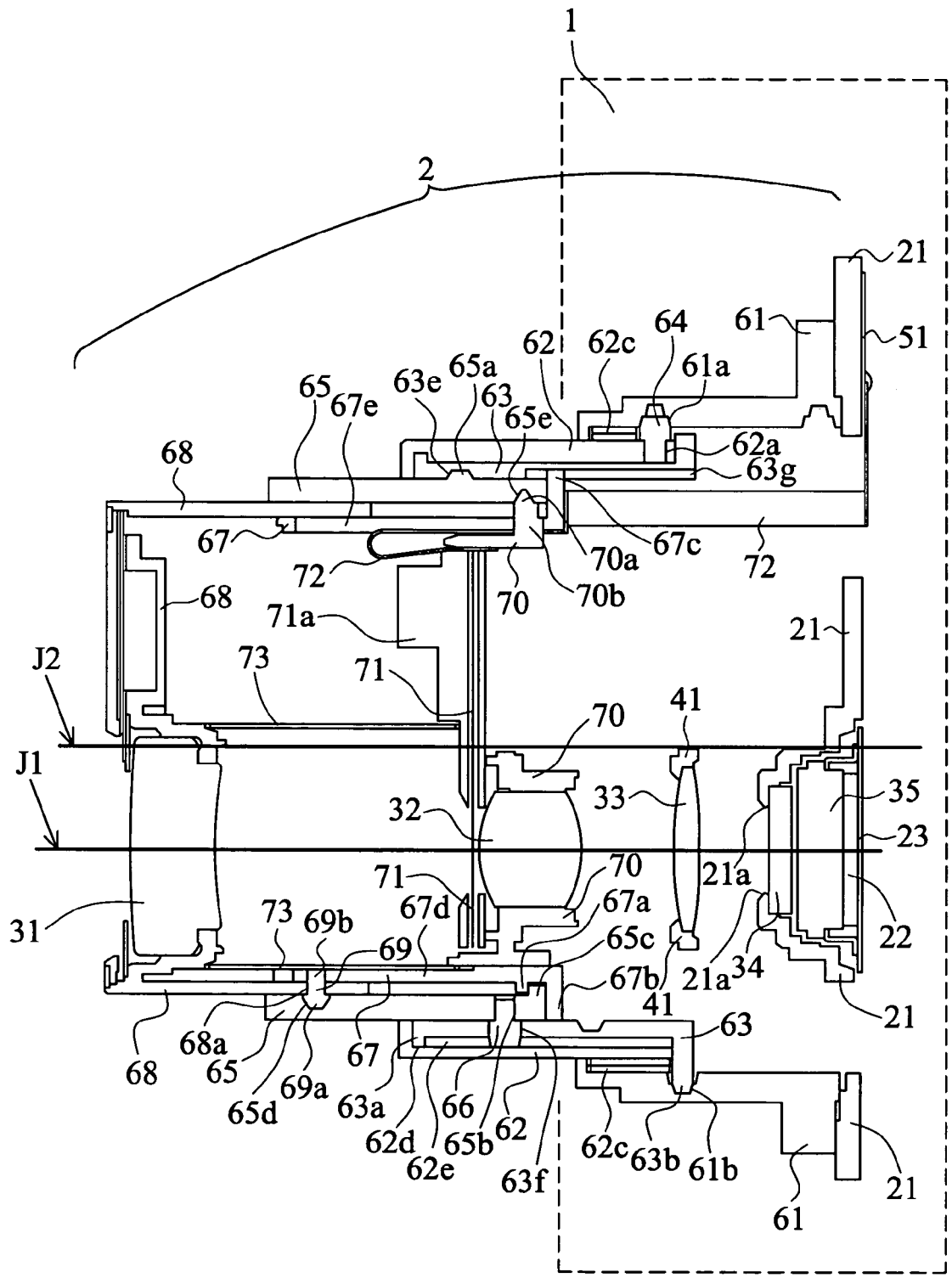
FIG. 1 is a cross section of an embodiment of a lens barrel in a full zoom position.

FIG. 1 is a cross section of an embodiment of a lens barrel 2 in a full zoom or wide-angled view of a photographing position. An optical photography system comprises a first lens group 31, a second lens group 32, a third lens group 33, a low-pass filer 34, and a charge-coupled device (CCD) 35, arranged in order from a photographic subject. An optical axis of the optical photography system is defined as J1, parallel to a central axis J2 of the lens barrel, and the optical axis J1 is eccentric from the central axis J2. Zooming is performed by moving the first lens group 31 and the second lens group 32 in a direction of the optical axis J1, respectively. Focusing is performed by moving the third lens group 33 in the direction of the optical axis J1. A light from the object side passing through the first lens group 31, the second lens group 32, and the third lens group 33 passes through the low-pass filter 34 and is guided to the CCD 35. Note that the term "optical axial direction" used in the following is particularly defined as directions parallel to the optical axis J1.

The fixing barrel 61 is fixed on a body 1. A CCD holder 21 located behind the fixing barrel 61 covers an opening of the fixing barrel 61. The low-pass filter 34 is attached to and supported by the CCD holder 21 at a front opening 21a. The CCD 35 and a heat sink 22 are integrally connected. The CCD 35 is fixed on the CCD holder 21 via the heat sink 22. A CCD flexible printed circuit board (FPC) 23 for transmitting electronic signals produced by the CCD is disposed behind the heat sink 22.

Figure 2:
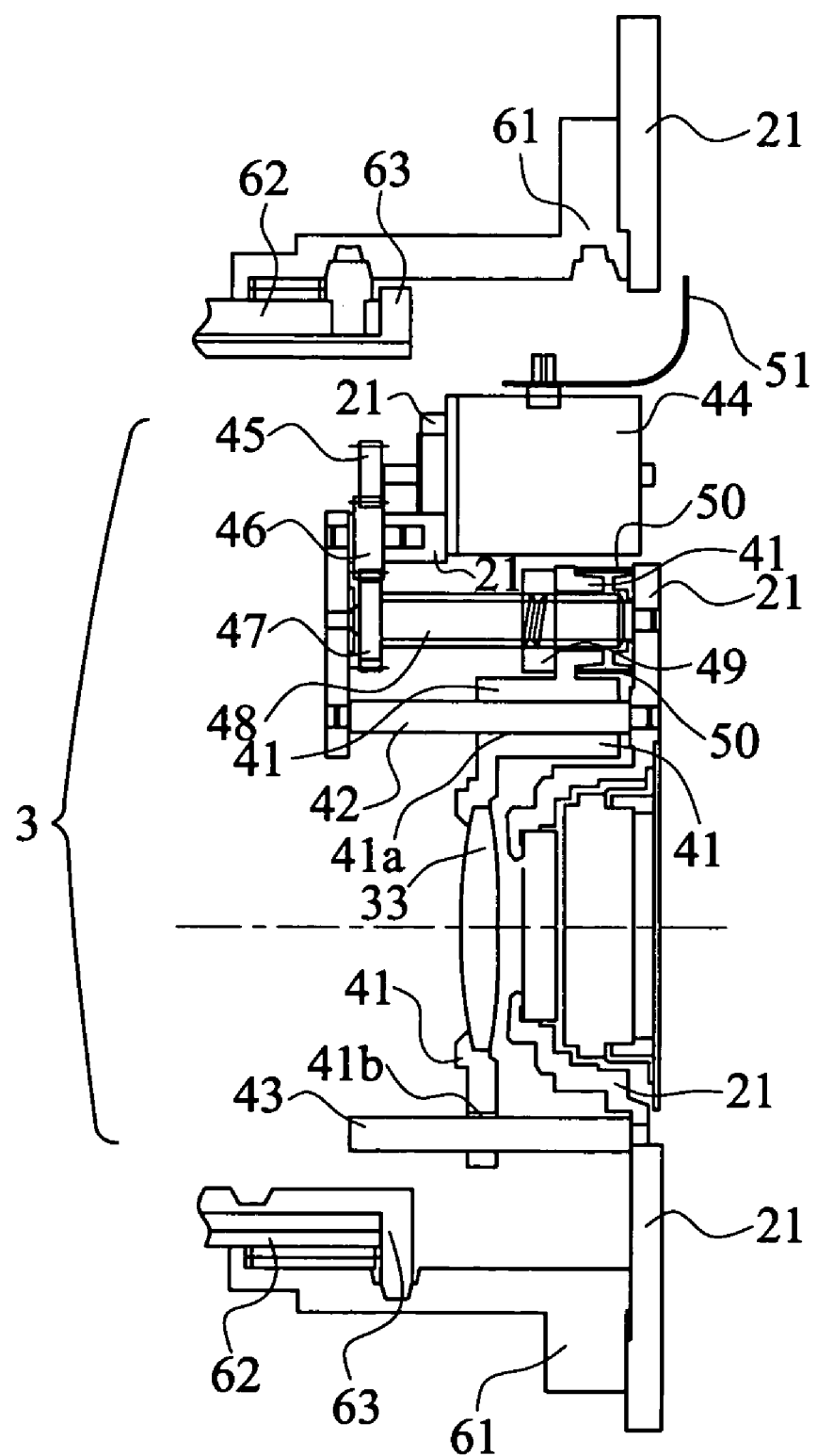
FIG. 2 is a cross section of a lens barrel of a focus driving mechanism.

The third lens group 33 for focus and a focus driving mechanism 3 for driving the third lens group 33 are correspondingly disposed near the CCD holder 21. FIG. 2 is a cross section of a lens barrel of a focus driving mechanism 3. A third lens frame 41 supporting the third lens group 33 is slidably disposed on a pair of guide shafts A42 and A43 of the CCD holder 21 in the optical axial direction. The guide shaft A42 is a main shaft of the third lens frame 41, and the guide shaft B43 is used for rotational control of the third lens frame 41. The guide shafts A42 and A43 can be slidably inserted into guiding holes 41a and 41b formed on the third lens frame 41.

Focus motor 44 is fixed in the inner side of the fixing barrel 61 corresponding to the third lens group 33 and the CCD holder 21 at a side of the CCD 35. The rotational driving force of the focus motor 44 is transferred to feed screws 48 from the focus motor gear 45 via the focus gears 46 and 47. The feed screws 48 and nuts 49 are engaged to allow back and forth movement of the third lens frame 41 along the optical axis. The rotational driving force of the focus motor 44 can be reduced by focus gears 46 and 47 such that the feed screws 48 have sufficient rotational torque. The third lens frame 41 is biased by the spring 50 thereof. The focus motor 44 is controlled by camera control circuit via the FPC 51 for driving the lens disposed behind the CCD holder 21.

Figure 3:
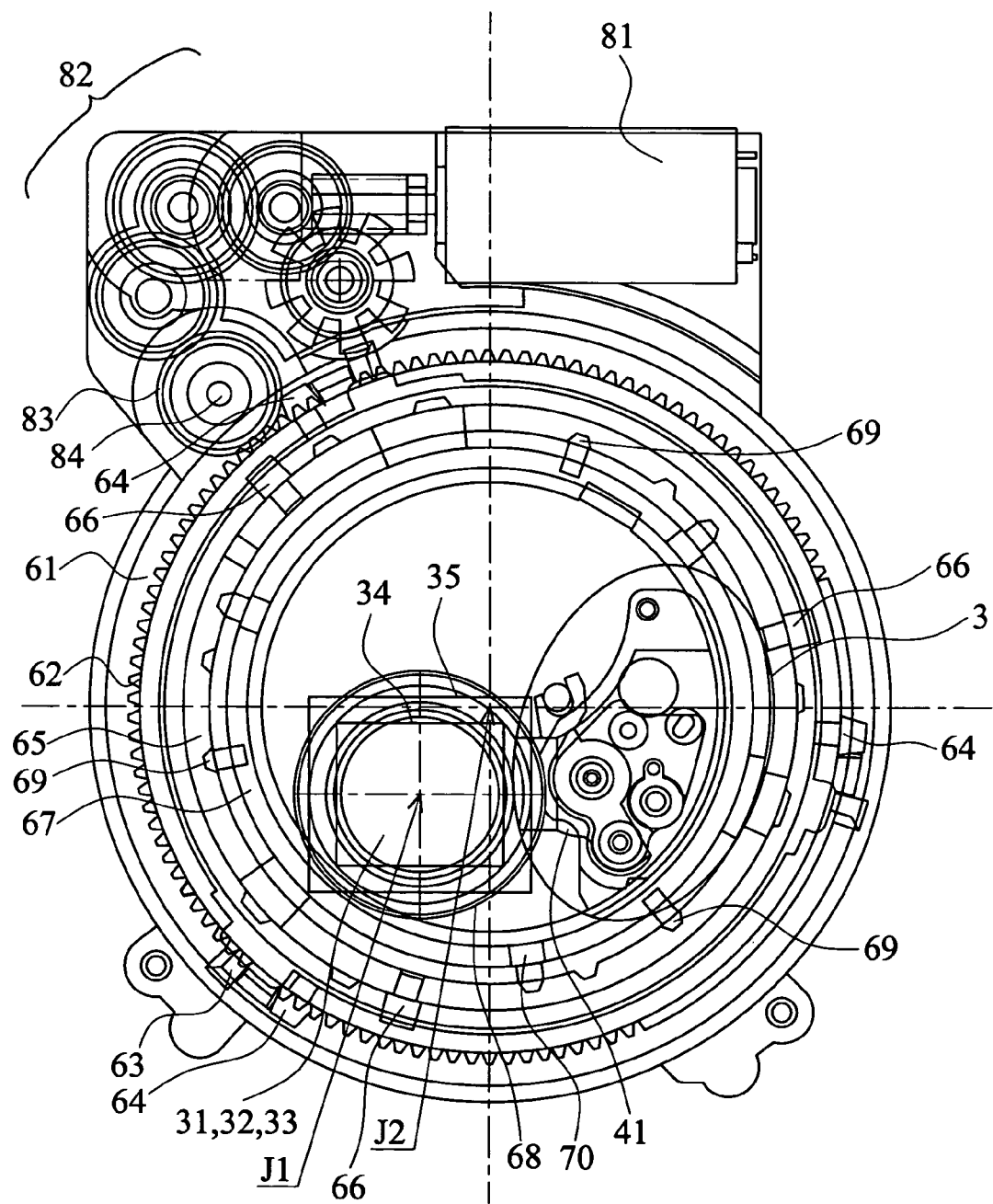
FIG. 3 is a front perspective view of a lens barrel in a photographing position.

FIG. 3 is a front perspective view of a lens barrel 2 in a photographing position. The upper portion of the fixing barrel 61 is disposed with zoom motor 81 and speed-reduction gear set 82. The driving force of the zoom motor 81 is transferred to the zoom gear 83 via the speed-reduction gear 82. The zoom gear 83 is rotatably supported with respect to the fixing barrel 61 by the gear shaft 84 parallel to the optical axial direction. The zoom motor 81, the speed-reduction gear 82, and the zoom gear 83 constitute an extending and retracting mechanism of the driving mechanism. The zoom motor 81 is controlled by a camera control circuit via the FPC 51 located behind the CCD holder 21.

Figure 4:
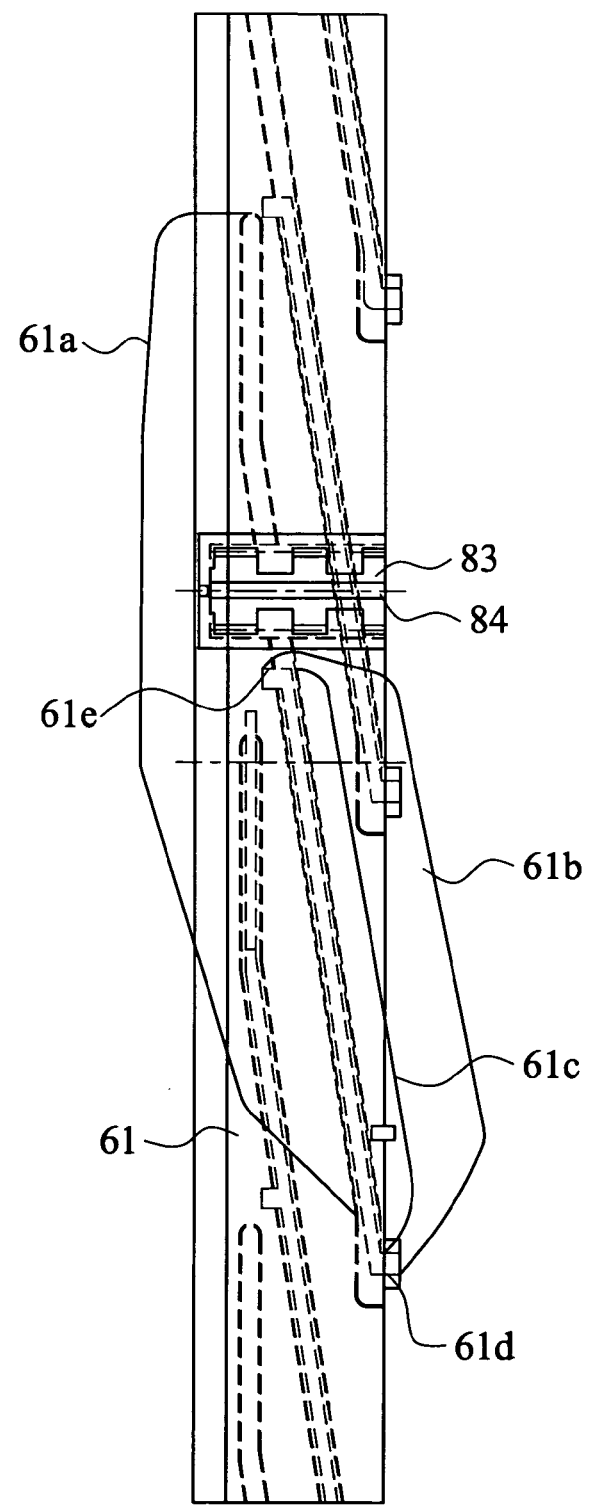
FIG. 4 is a development viewed from an outer circumference of a fixing barrel.
Figure 5:
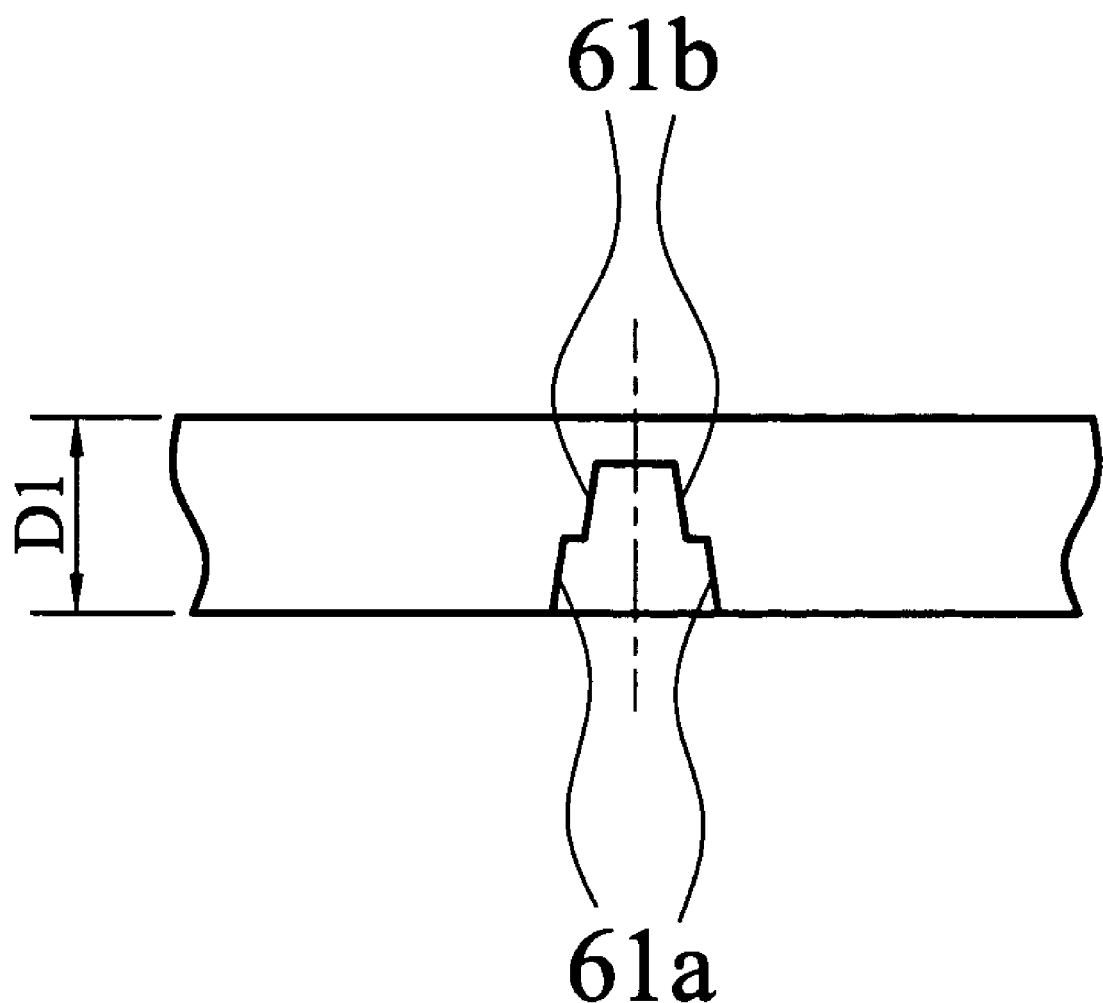
FIG. 5 is a cross section of a cam groove of the fixing barrel.

FIG. 4 is a development viewed from an outer circumference of a fixing barrel 61. Three cam grooves 61a for guiding the rotary barrel 62 and three cam grooves 61b for guiding the guiding barrel 63 are formed on the inner circumference of the fixing barrel 61. The cam grooves 61b of the guiding barrel 63 are deeper than the cam grooves 61a of the rotary barrel 62. The cam grooves 61a and 61b have the same grooved trace region 61c. The region 61c is divided into two sections, as shown in FIG. 5.

Figure 6:
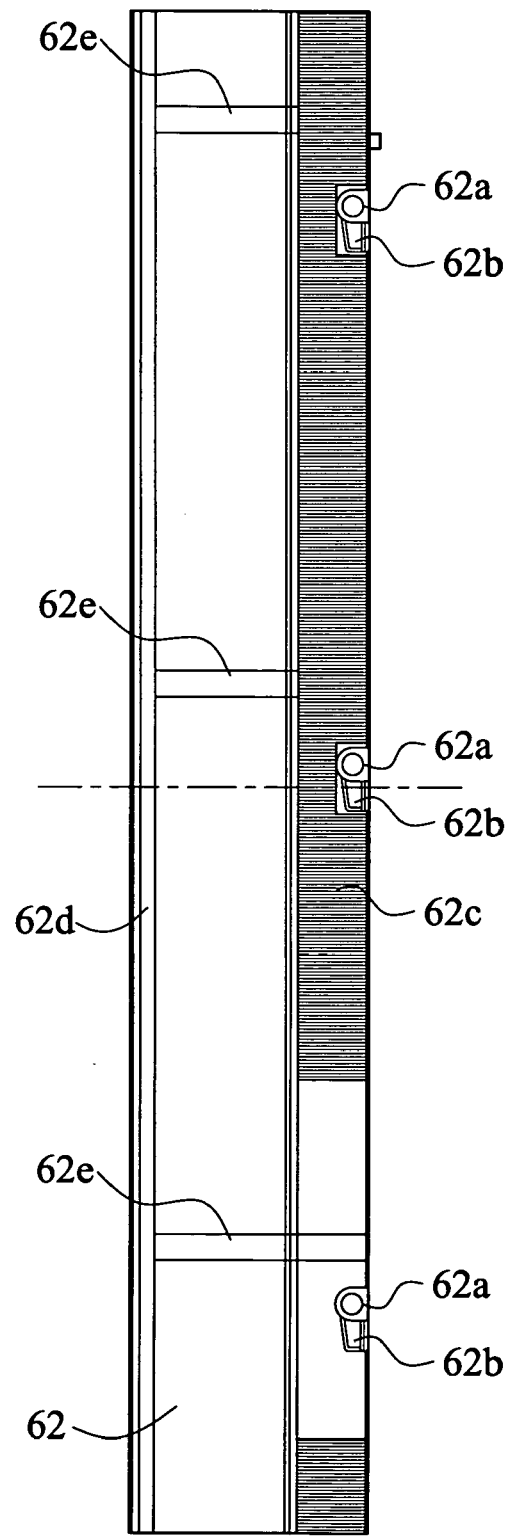
FIG. 6 is a development viewed from an outer circumference of a rotary barrel.

FIG. 6 is a development viewed from an outer circumference of a rotary barrel 62. The rotary barrel 62 is disposed on the inner circumference of the fixing barrel 61. Three rotary barrel cam-followers 64 are inserted into the holes 62a of the rotary barrel 62 to engage with the cam groove 61a of the fixing barrel 61. A protrusion 62b engaged with the cam groove 61a of the fixing barrel 61 is formed in the vicinity of the inserting position of the three rotary barrel cam-followers 64 on the outer circumference of the rotary barrel 62. The function of the protrusion 62b is discussed hereinafter. The outer circumference of the rotary barrel 62 comprises a gear portion 62c meshed with the zoom gear 83. The zoom motor 81, speed-reduction gear 82, zoom gear 83 constitute a driving mechanism for generating rotational driving force. The rotary barrel 62 rotates about the central axis J2 such that the rotary barrel 62 extends or retracts along the cam groove 61a of the fixing barrel 61.

Figure 7:
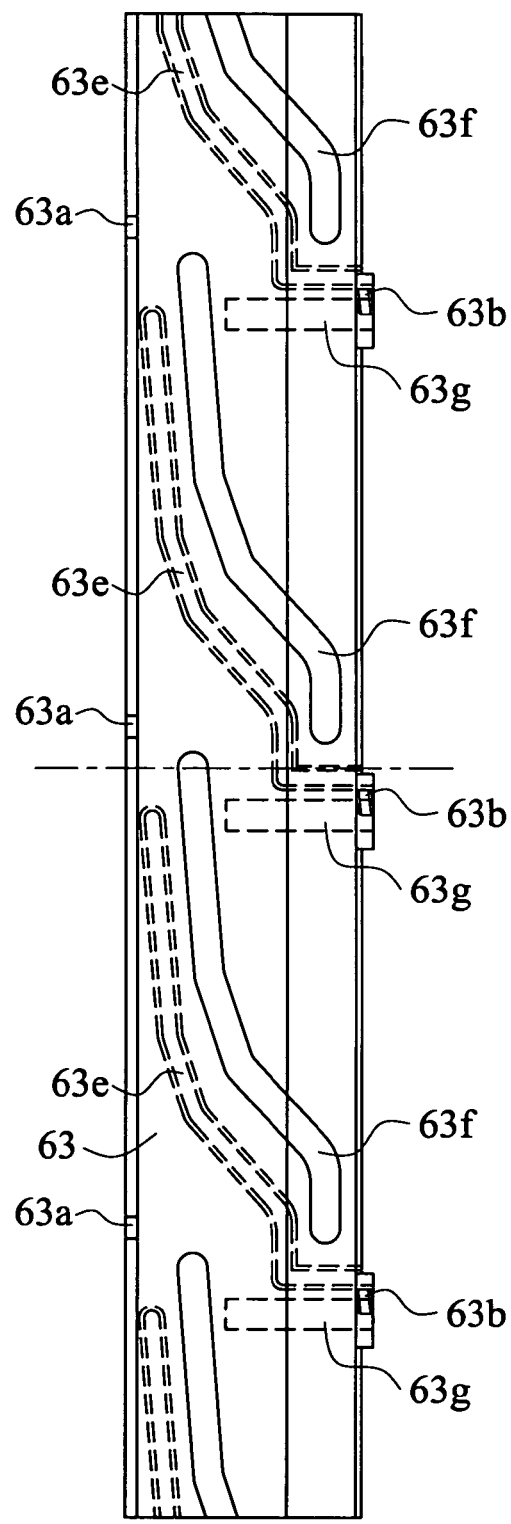
FIG. 7 is a development viewed from an outer circumference of a guiding barrel.
Figure 8:
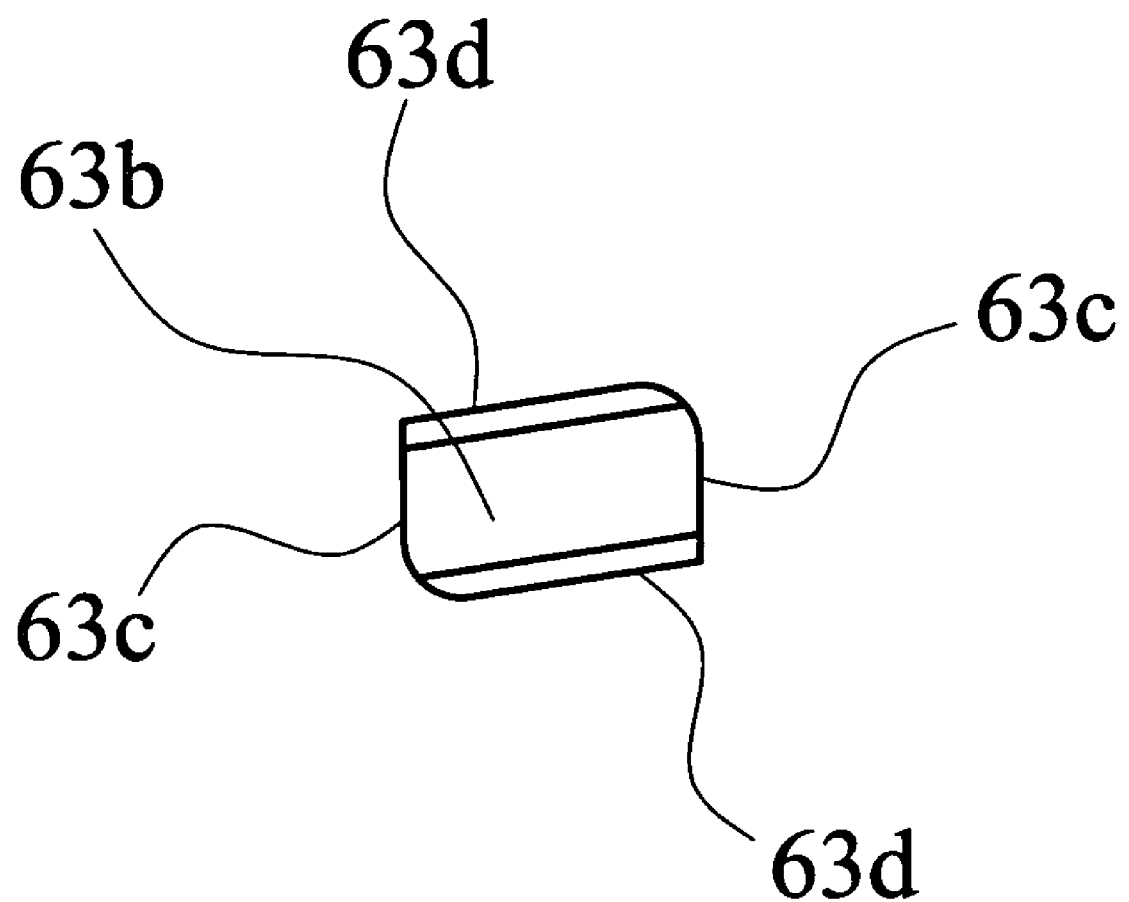
FIG. 8 is a cross section of a cam-follower of a guiding barrel.

FIG. 7 is a development viewed from an outer circumference of a guiding barrel 63. The guiding barrel 63 is disposed on the inner circumference of the rotary barrel 62. A hook 63a formed on the outer circumference of the guiding barrel 63 is engaged with a groove 62d on the inner circumference of the rotary barrel 62. The hook 63a corresponding to the rotary barrel 62 is moved and controlled in the optical axial direction and mutually rotatably supported. Three cam-followers 63b formed on the outer circumference of the guiding barrel 63 are engaged with the cam grooves 61b of the fixing barrel 61. A cam-follower 63b of the guiding barrel 63 has a parallelogram cross section, as shown in FIG. 8. The cam groove 61b of the fixing barrel 61 has a linear trench 61d and 61e engaged with a plane 63c of the cam-follower 63b. The cam groove 61b of the fixing barrel 61 has a sloped region engaged with the plane 63d of the cam-follower 63b.

Figure 9:
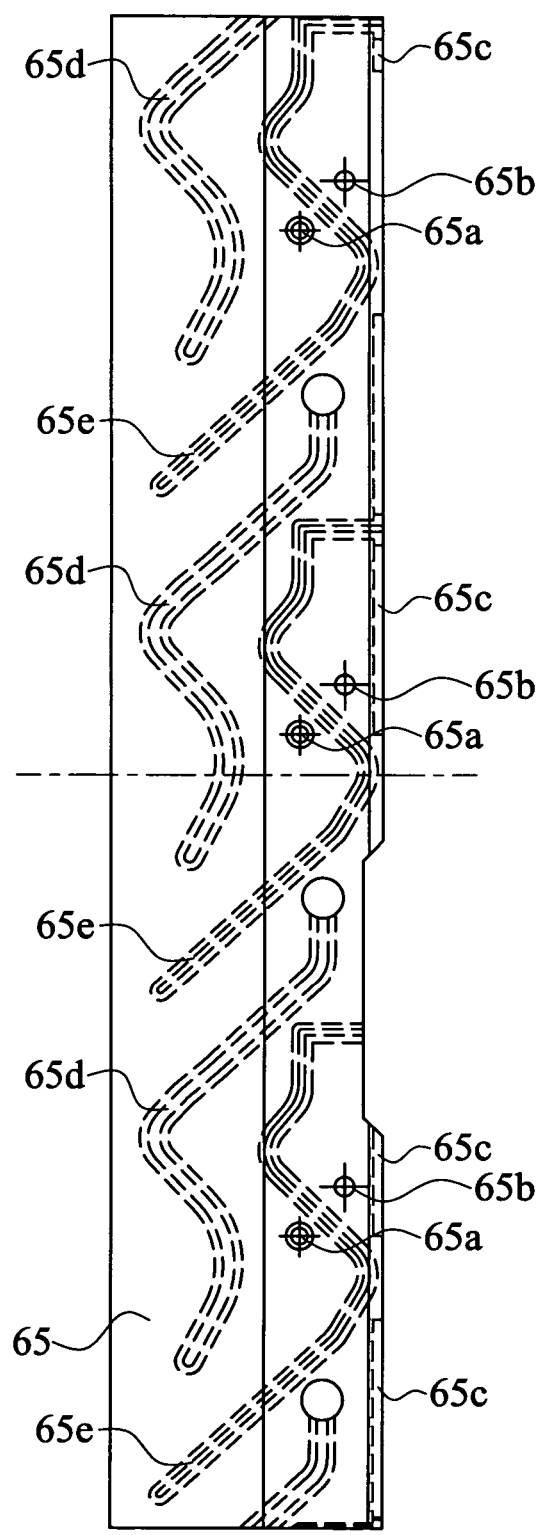
FIG. 9 is a development viewed from an outer circumference of a cam barrel.

FIG. 9 is a development viewed from an outer circumference of a cam barrel 65. The cam barrel 65 is located on an inner circumference of the guiding barrel 63. Three cam-followers 65a are formed on the outer circumference. The cam-followers 65a are engaged with the guiding barrel 63 and rotate with respect to the guiding barrel 63 to extend and retract from the cam groove 63e. The cam barrel 65 comprises holes 65b defined thereon and three cam barrel guide shafts 66 inserted therein. The cam barrel guide shafts 66 penetrate through the holes 63f of the guiding barrel 63 to engage the linear trench 62e in the optical axial direction on the inner circumference of the rotary barrel 62. Thus, the cam barrel 65 does not rotate with respect to the rotary barrel 62, but is movable in the optical axial direction.

Namely, when the rotary barrel 62 rotates with the guiding barrel 63, the cam barrel 65 moves in and out along the cam groove 63 of the guiding barrel 63.

Figure 10:
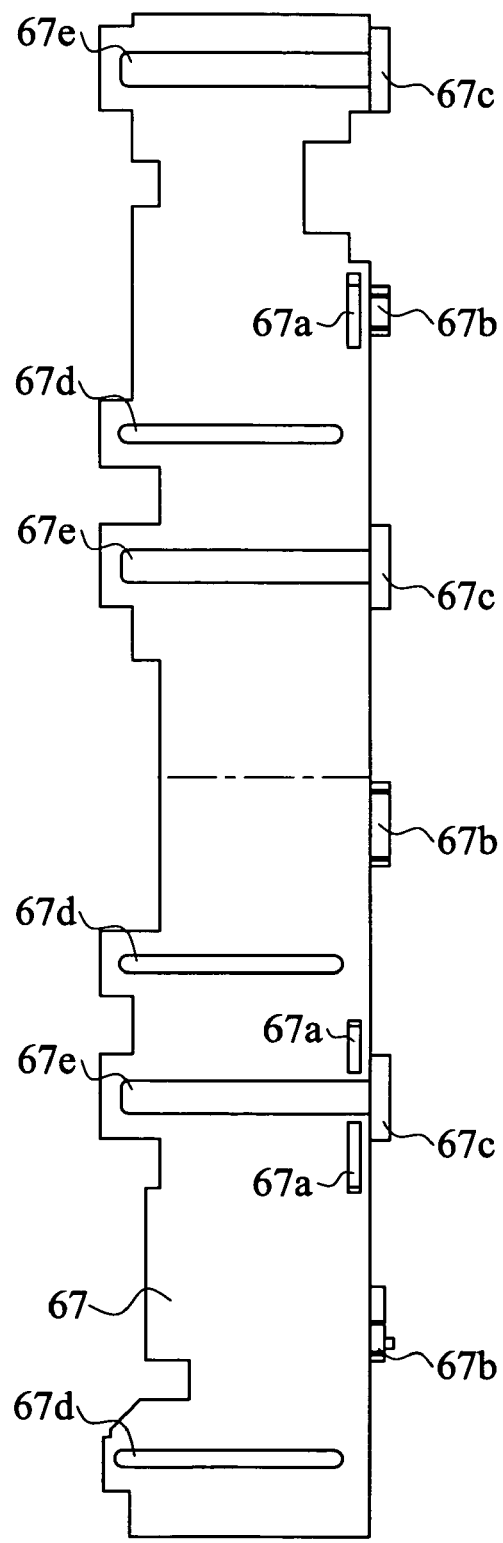
FIG. 10 is a development viewed from an outer circumference of a straight barrel.

FIG. 10 is a development viewed from an outer circumference of a straight barrel 67. The straight barrel 67 is disposed on an inner side of the cam barrel 65. The hook 65c on the inner circumference of the cam barrel 65 grasps protrusions 67a and 67b on the outer circumference of the straight barrel 67 such that movement in the optical axial direction is controlled and the cam barrel 65 and the straight barrel 67 are mutually rotatably supported. The guiding hook 67c disposed on the outer circumference of the straight barrel 67 is engaged with the linear trench 63g in the optical axial direction on the inner circumference of the guiding barrel 63. Thus, the straight barrel 67 cannot rotate with the guiding barrel 63 but can rotate in the optical axial direction.

Figure 11:
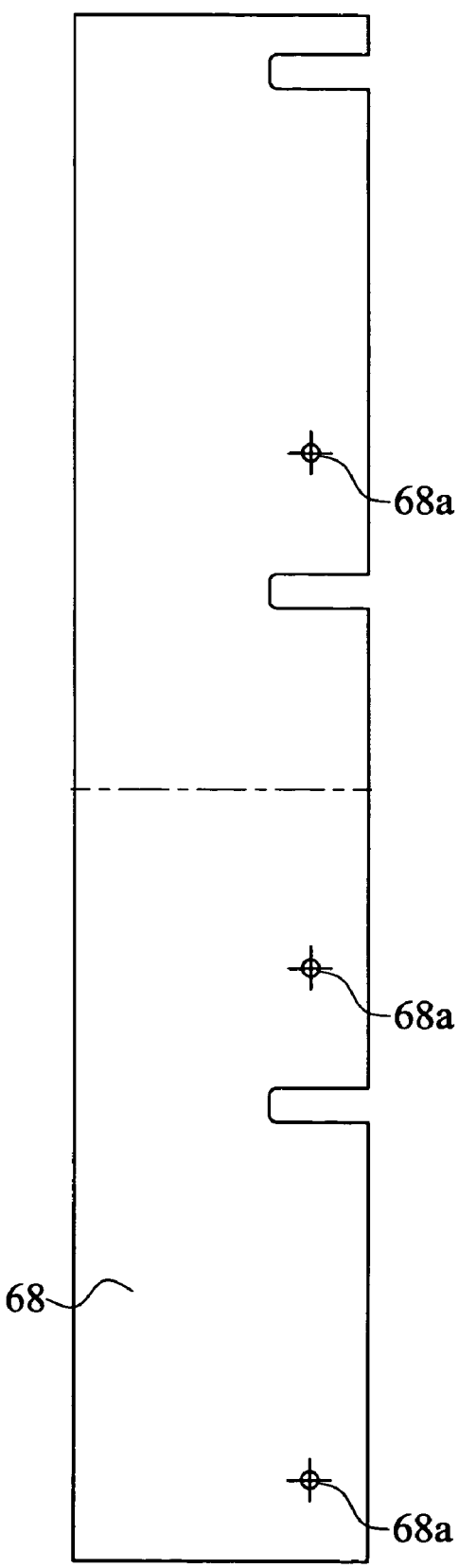
FIG. 11 is a development viewed from an outer circumference of a first lens frame.

FIG. 11 is a development viewed from an outer circumference of a first lens frame 68. The first lens frame 68 is disposed on an inner side of the cam barrel 65 and supports the first lens group 31. Three cam-followers 69 of the first lens frame are inserted into the holes 68a of the first lens frame 68, and the cam-follower portion 69a on the outer periphery of the cam-followers 69 is engaged with the cam groove 65d on the inner circumference of the cam barrel 65. Additionally, a guiding portion 69b on the inner side of the cam-follower 69 of the first lens frame is engaged with a straight guiding hole 67d of the straight barrel 67 in the optical axial direction. Thus, the cam barrel 65 rotates with respect to the straight barrel 67, and the cam barrel 65 rotates with respect to the guiding barrel 63, corresponding to relative rotations between the straight barrel 67 and the guiding barrel 63, such that the first lens frame 68 can extend or retract along the cam groove 65d of the cam barrel 65 in the optical axial direction.

Figure 12:
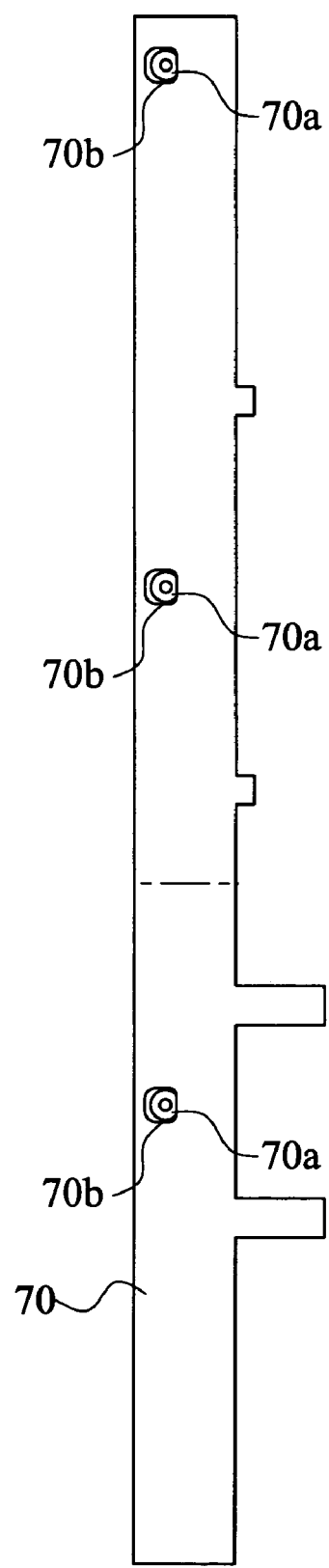
FIG. 12 is a development viewed from an outer circumference of a second lens frame.

FIG. 12 is a development viewed from an outer circumference of a second lens frame 70. The second lens frame 70 is disposed on an inner side of the straight barrel 67 and supports the second lens group 32. Three cam-followers 70a formed on the outer circumference of the second lens frame 70 are engaged with the cam groove 65e on the inner circumference of the cam barrel 65. Additionally, a root 70b of the cam-followers 70a of the second lens frame 70 is engaged with a straight guiding hole 67e of the straight barrel 67 in the optical axial direction. Thus, the cam barrel 65 rotates with respect to the straight barrel 67, and the cam barrel 65 rotates with respect to the guiding barrel 63, corresponding to relative rotations between the straight barrel 67 and the guiding barrel 63, such that the second lens frame 70 can extend or retract along the cam groove 65e of the cam barrel 65 in the optical axial direction.

The second lens frame 70 comprises a shutter unit 71 for blocking incident light from the side of the photographic subject. The shutter unit 71 is disposed on an actuator 71a. A flexible printed circuit board (FPC) for shutter 72 connects the actuator 71a and the camera control circuit. The FPC 72 passing from the shutter unit 71 through the internal of the lens barrel 2 is connected to another lens driving FPC 51 disposed behind the CCD holder 21.

A bias spring 73 is disposed between the first lens frame 68 and the second lens frame 70 such that the first lens frame 68 and the second lens frame 70 are biased to each other in the optical axial direction and detached from each other. Thus, the cam engaging portion of the cam barrel 65 of the first lens frame 68 and that of the cam barrel 65 of the second lens frame 70 can be eliminated, stabilizing the optical performance.

The movement of the lens barrel 2 from a housed position to a photographing position is discussed in the following.

Figure 13:
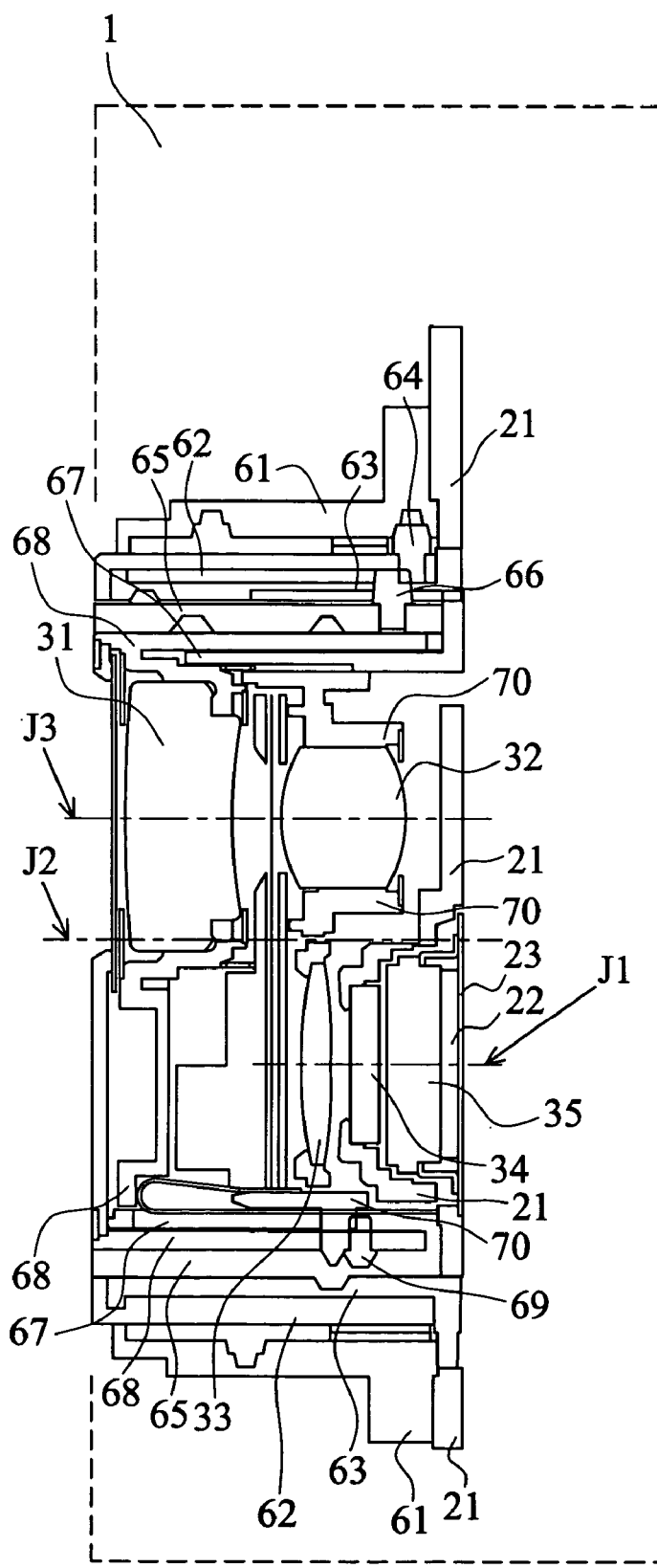
FIG. 13 is a cross section of a lens barrel in a housed position.
Figure 14:
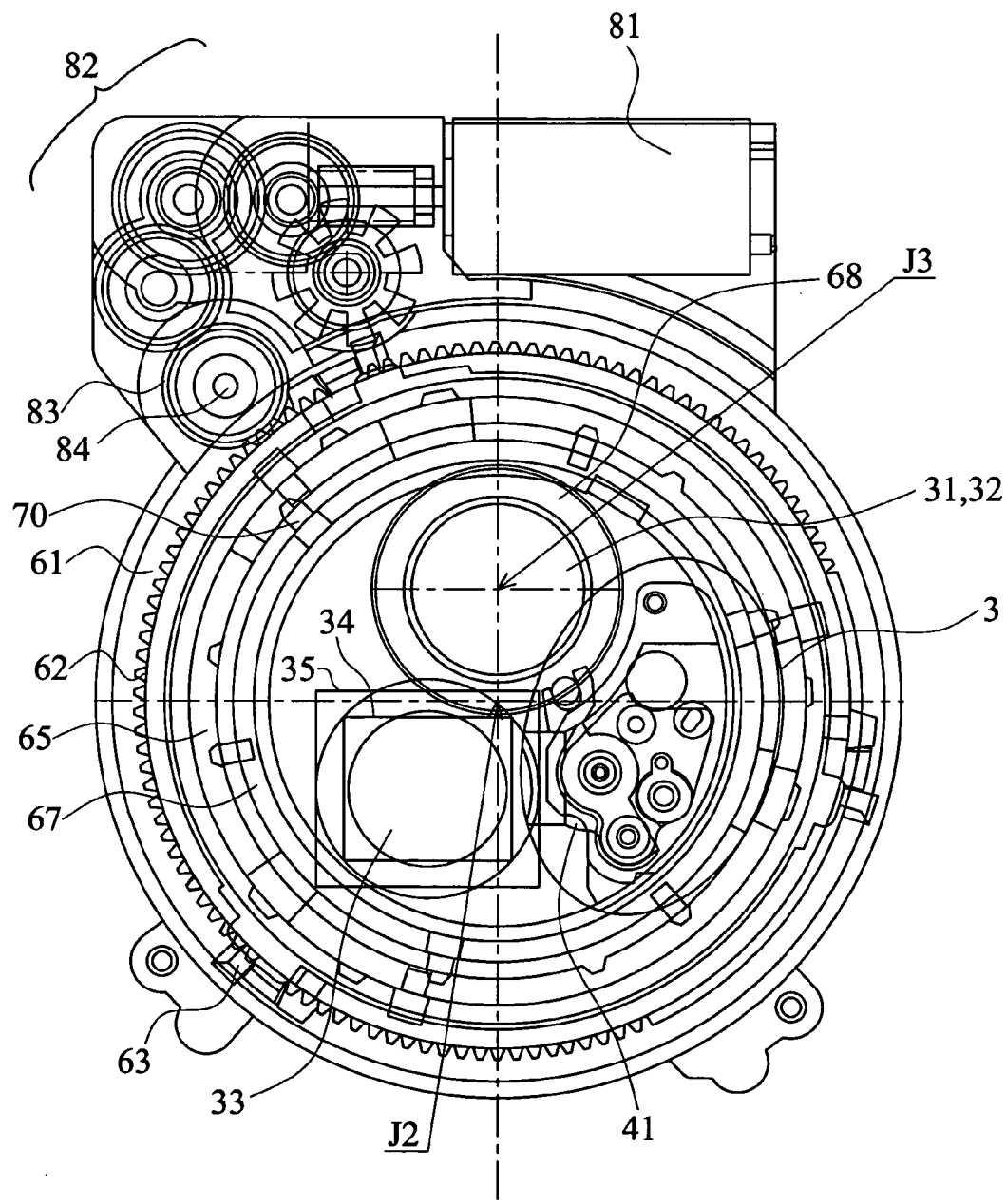
FIG. 14 is a front perspective view of a lens barrel in a housed position.

FIG. 13 is a cross section of a lens barrel 2 in a housed position. FIG. 14 is a front perspective view of a lens barrel 2 in a housed position. The central axis of the first lens group 31 and the second lens group 32 is defined as "J3", housed at a side of the third lens group 33, the low-pass filter 34, and the CCD 35, at a position biased from the photographic optical axis J1 at the side of the focus driving mechanism 3. Namely, the first lens group 31, the second lens group 32, the third lens group 33, the low-pass filter 34, the CCD 35, and three blocks of the focus driving mechanism 3 are housed on a plane, substantially perpendicular to the optical axis.

Figure 15:
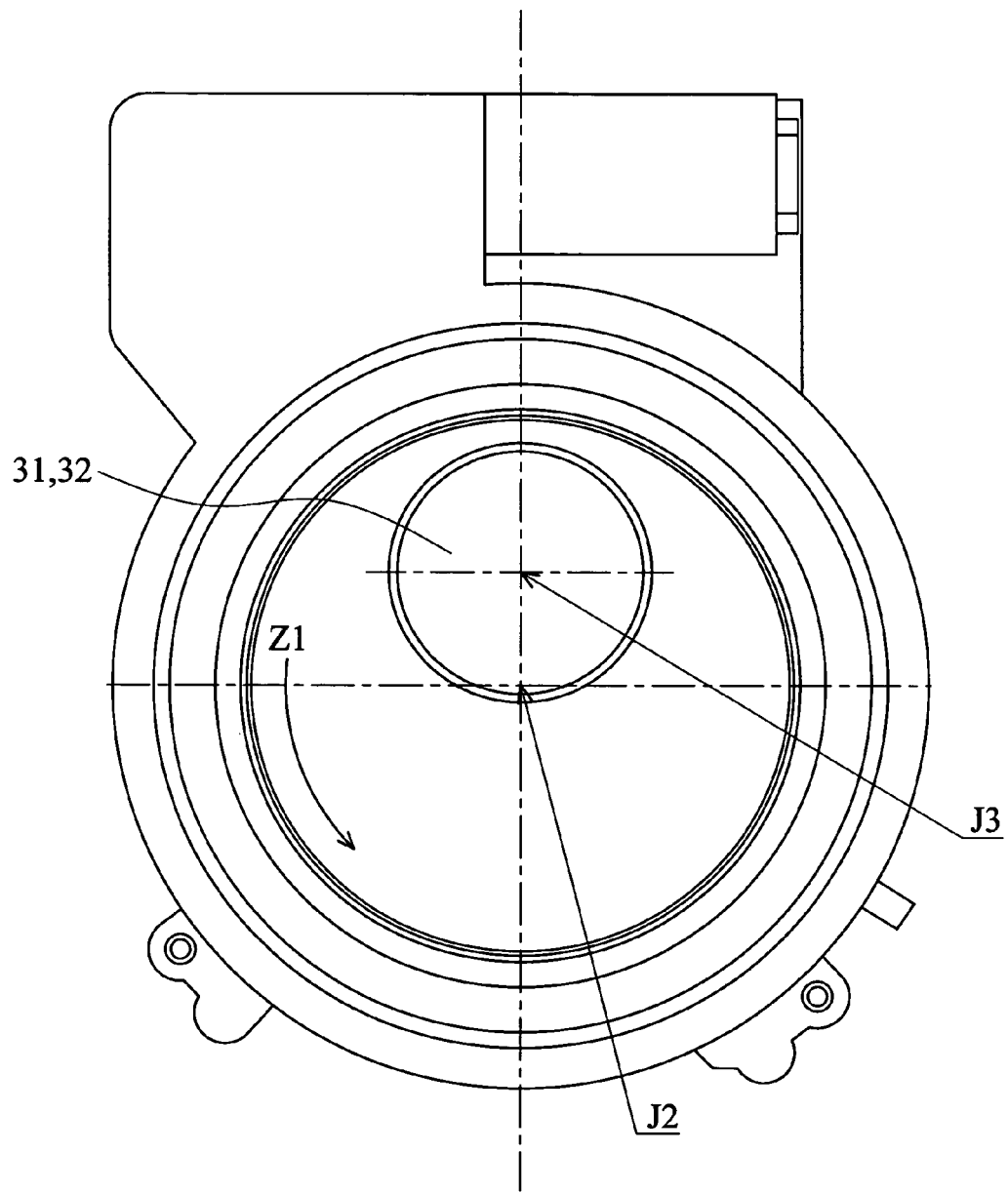
FIG. 15 is a front view of a lens barrel in a housed position.
Figure 16:
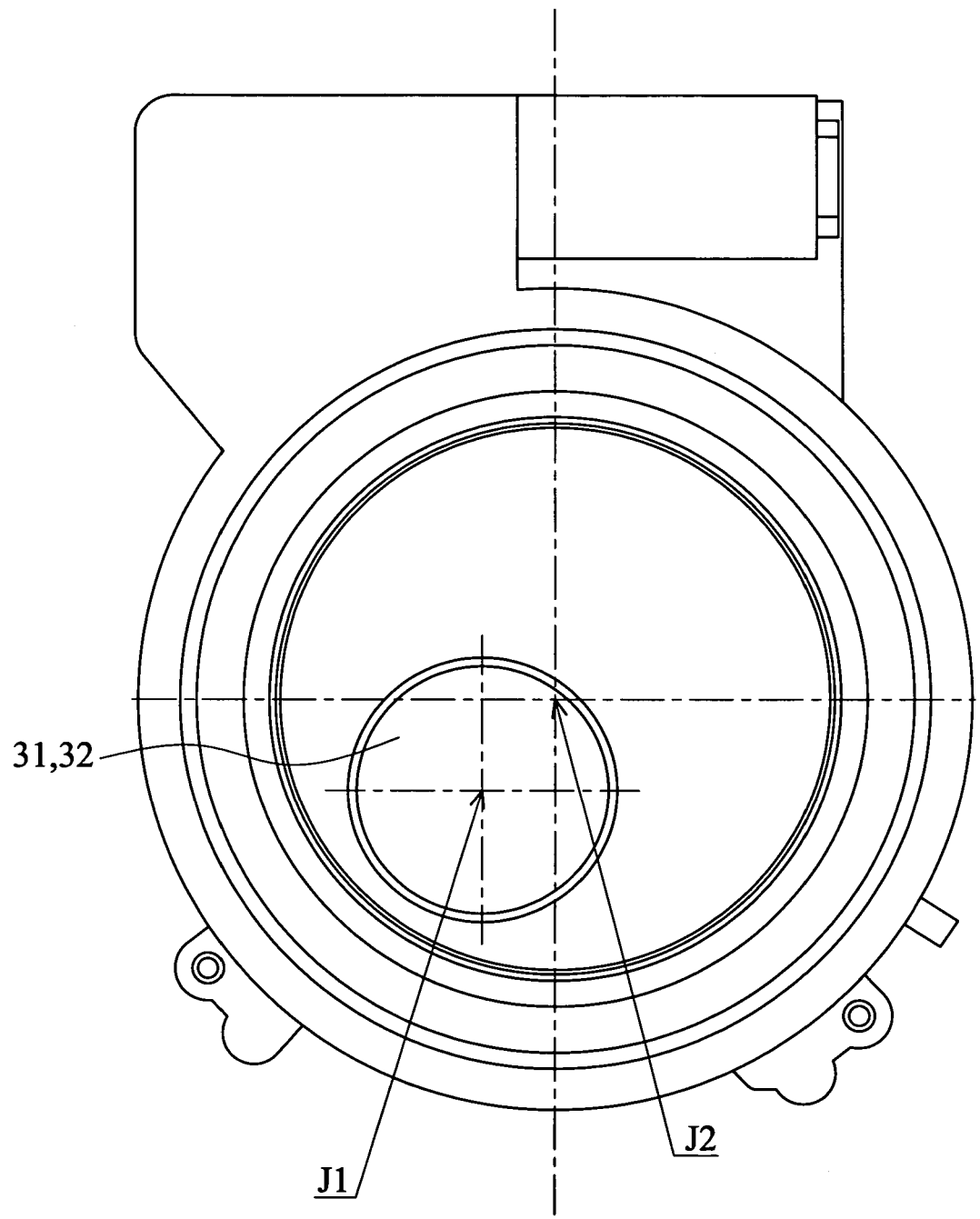
FIG. 16 is a front view of a lens barrel in a photographing position.

The first and second lens groups 31 and 32 rotate about the central axis J2 of the lens barrel 2 as a center, and are extended in the optical axial direction to a photographing position, as shown in FIG. 1. If viewed from a front view of the lens barrel 2, as shown in FIG. 15, the first and second lens groups 31 and 32 rotate in a direction Z1 and extend to the photographing position of FIG. 16. In the photographing position, the central axis J3 of the first and second lens groups 31 and 32 corresponds to the photographic optical axis J1. An eccentric distance between the central axis J2 of the lens barrel 2 and the photographic optical axis J1 is equal to an eccentric distance between the central axis J2 of the lens barrel 2 and the central axis J3 of the first and second lens groups 31 and 32.

Figure 17:
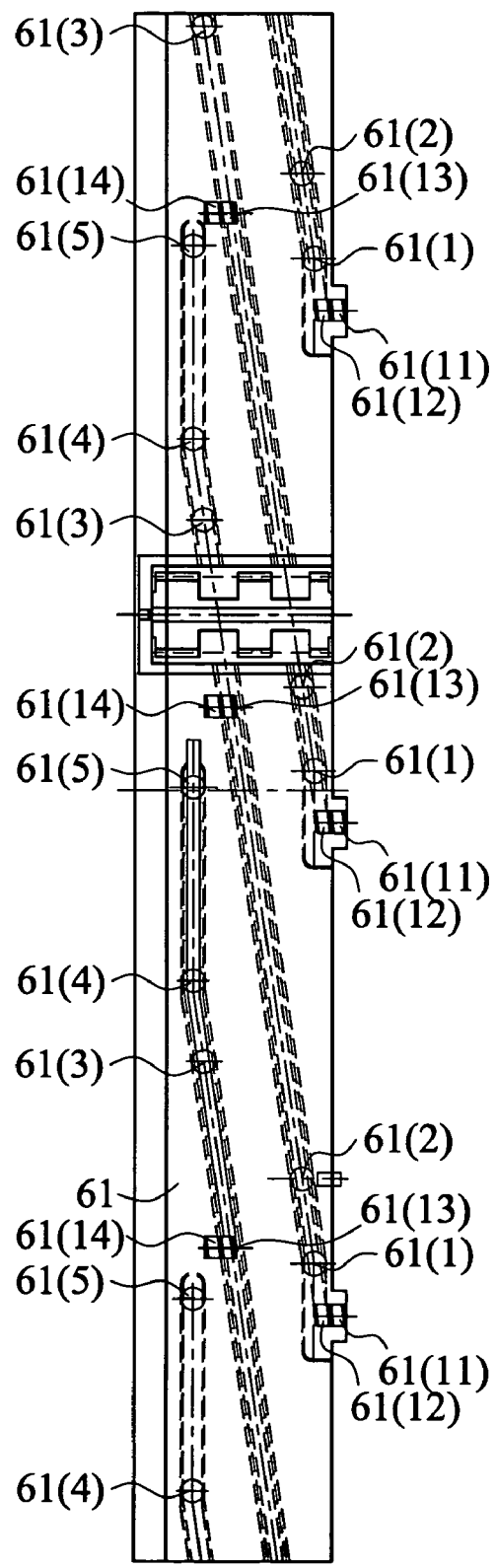
FIG. 17 is a schematic view indicating positions of cam grooves of a fixing barrel.
Figure 18:
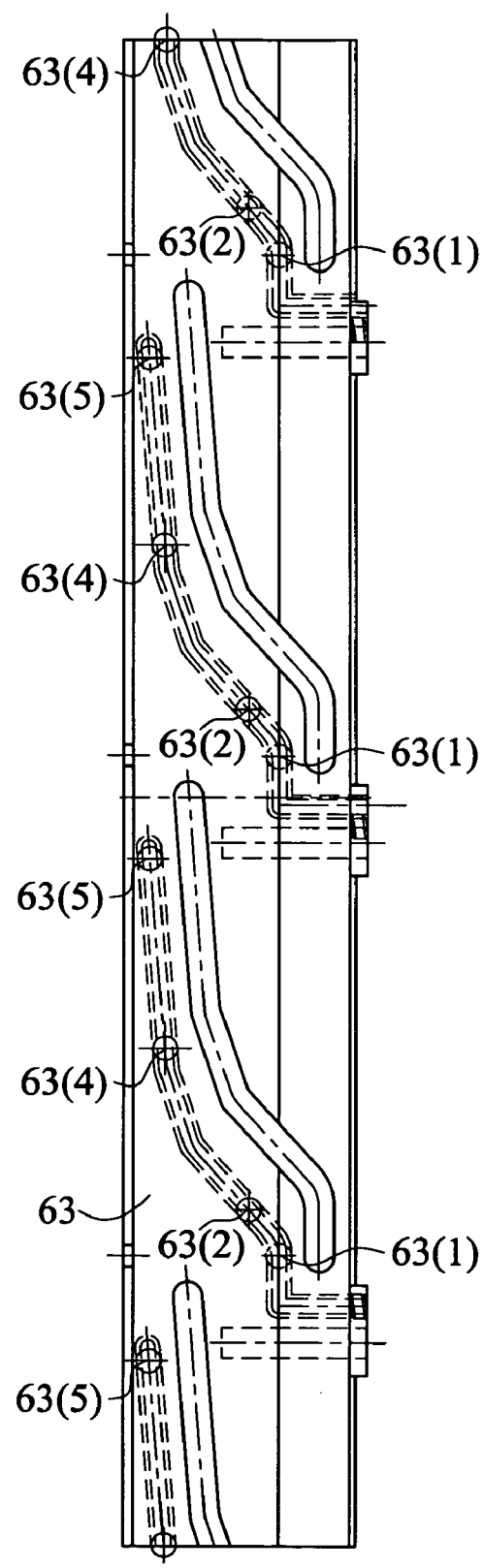
FIG. 18 is a schematic view indicating positions of cam grooves of a guiding barrel.
Figure 19:
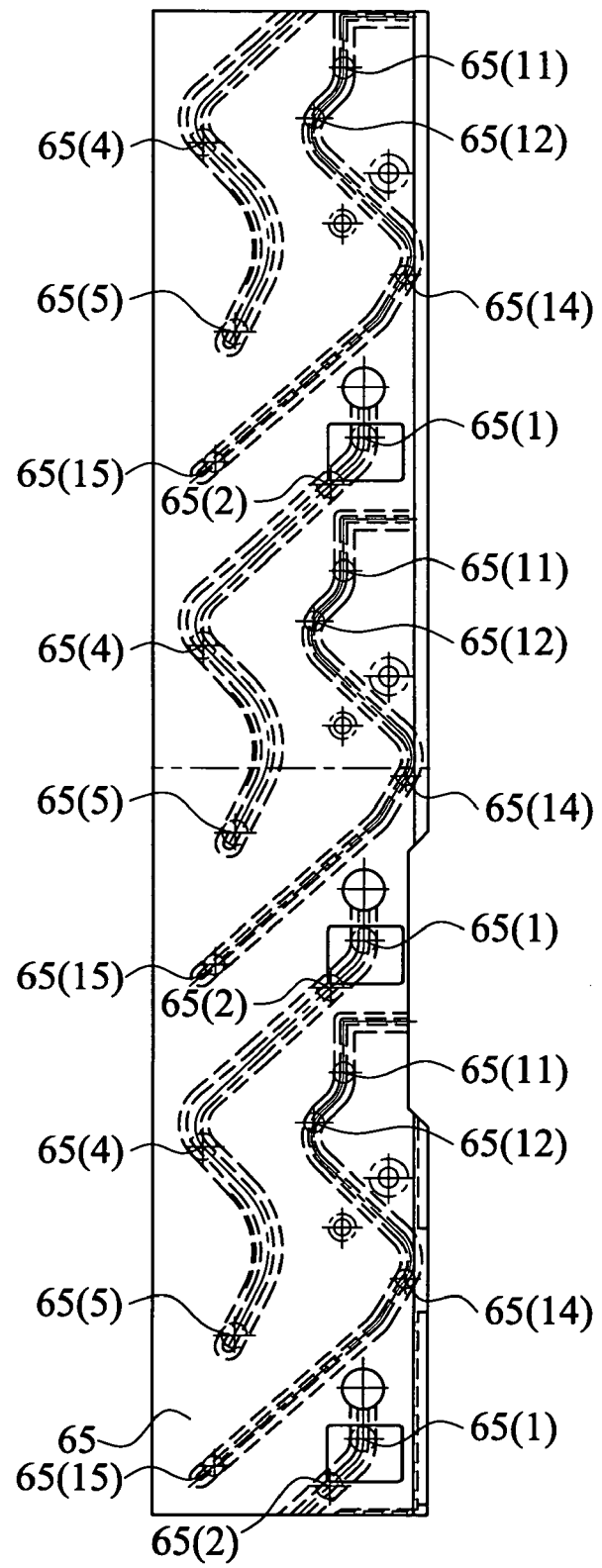
FIG. 19 is a schematic view indicating positions of cam grooves of a cam barrel.

When the lens barrel 2 is in a housed position, the cam-follower 64 of the rotary barrel 62 is disposed at a position 61(1) of the cam groove of the fixing barrel 61. The cam-follower 65a of the cam barrel 65 is disposed at a position 63(1) of the cam groove of the guiding barrel 63. A cam-follower pin 69 inserted into the first lens frame 68 is disposed at a position 65(1) of the cam groove of the cam barrel 65. A cam-follower 67 of the second lens frame 70 is disposed at a position 65(11) of the cam groove of the cam barrel 65, as shown in FIGS. 17, 18, and 19.

By rotating the zoom gear 83, the rotary barrel 62 rotating about the central axis J2, the rotary barrel cam-follower pin 64 is withdrawn in the optical axial direction from the position 61(1) of the cam groove of the fixing barrel 61 to the position 61(2). Additionally, the guiding barrel 63 controls the movement of the rotary barrel 62 in the optical axial direction, and is extended in the optical axial direction from the position 61(11) to the position 61(12) via the guidance of the cam groove 61b of the fixing barrel 61. The guiding barrel 63 moving between the position 61(11) and 61(12) of the cam groove of the fixing barrel 61 such that relative rotation is generated between the rotary barrel 62 and the guiding barrel 63. The cam-follower 65a of the cam barrel 65 moves from position 63(1) to 63(2) of the cam groove of the guiding barrel 63, and meanwhile, in order to generate relative rotation between the cam barrel 65 and the guiding barrel 63, the first lens frame cam-follower pin 69 moves from the position 65(1) to 65(2) of the cam groove of the cam barrel 65, and the second lens frame cam-follower pin 70a moves from the position 65(11) to 65(12) of the cam groove of the cam barrel 65.

When the rotary barrel cam-follower pin 64 reaches a position 61(12) of the cam groove of the fixing barrel 61, the cam-follower 63b of the guiding barrel 63 is driven at the position 61(12) of cam groove of the fixing barrel 61. The cam-follower 65a of the cam barrel 65 is driven at the position 63(2) of the cam groove of the guiding barrel 63. The cam-follower pin 69 of the first lens frame is driven at the position 65(2) of the cam groove of the cam barrel 65. The cam-follower 70a of the second lens frame 70 is driven at the position 65(12) of the cam groove 65.

Due to the described motions, the guiding barrel 63, the cam barrel 65, the first lens frame 68, and the second lens frame 70 are directly extended in the optical axial direction. Thus, the first lens group 31 and the second lens group 32 are extended from the object side in the optical axial direction.

As a result, before rotational movement of the first lens group 31 and the second lens group 32, the first lens group 31 and the second lens group 32 are at a position not interfering with the third lens group 33, the low-pass filter 34, the CCD 35, and the focus driving mechanism 3 when extending.

As the cam-follower pin 64 of the rotary barrel is extended while rotating from a position 61(2) of the cam groove of the fixing barrel 61 to the position 61(3) to extend the rotary barrel 62, the cam-follower 63b of the guiding barrel 63 reaches the position 61(13) of the fixing barrel 61. During the motion, the extended amount of the angle of the rotary barrel 62 is the same as that of the angle of the guiding barrel 63 such that the cam grooves 61a and 61b of the fixing barrel 61 are formed without relative rotation between the rotary barrel 62 and the guiding barrel 63.

Thus, the rotary barrel 62, the guiding barrel 63, the cam barrel 65, the straight barrel 67, the first lens frame 68, the second lens frame 70 are extended together by rotating about the central axis J2.

During rotation, when the cam-follower pin 64 of the rotary barrel passes through the position 61(13) of the cam groove of the fixing barrel 61, since the cam groove 61b thereof is deeper than the cam groove 61a, the cam-follower pin 64 of the rotary barrel is engaged with the cam groove 61a of the fixing barrel 61 at position 61(14). Since the protrusion 62b of the rotary barrel 62 is substantially engaged with the cam groove 61a of the fixing barrel 61, the zooming can be extended without varying loading. Namely, the cam-follower pin 64 of the rotary barrel is corresponding to the main guiding portion of the cam groove 61a of the fixing barrel 61. However, the cam-follower pin 64 passing through the position 61913) of the cam groove of the fixing barrel 61 is restricted, and thus, it is guided by a secondary guiding portion, which is a protrusion 62b of the rotary barrel 62. "Substantially engaged", as mentioned above, is defined in that engagement of the protrusion 62b of the rotary barrel 62 of the secondary guiding portion, compared with the engagement of the cam-follower 64 of the main guiding portion, does not over-limit guiding performance thereof.

When the cam-follower pin 64 of the rotary barrel is at the position 61(3) of the cam groove of the fixing barrel 61, and the cam-follower 63b of the guiding barrel 63 reaches the position 61(13), the photographic optical axis J1 and the central axes J3 of the first and second lens group 31, 32 coincide.

If the cam follower pin 64 of the rotary cam is rotated from the position 61(3) of the cam groove of the fixing barrel 61 to the position 61(4) while extending therefrom, the cam-follower 63b of the guiding barrel 63 moves from the position 61(13) to the position 61(14), extending in the optical axial direction. The described motion is the same as when the cam-follower pin 64 of the rotary barrel is moved from the position 61(1) to 61(2). That is, the relative rotation between the cam barrel 65 and the guiding barrel 63 makes the cam-follower pin 69 of the first lens frame move from the position 65(2) to the position 65(4) of the cam groove of the cam barrel 65, and the cam-follower 70a of the second lens frame 70 move from the position 65(12) to the position 65(14). This position is the full zoom position of the lens barrel 2, same as position of the cross section of FIG. 1.

Zooming motion from a full zoom to a minimum zoom of photographic position is discussed in the following.

Figure 20:
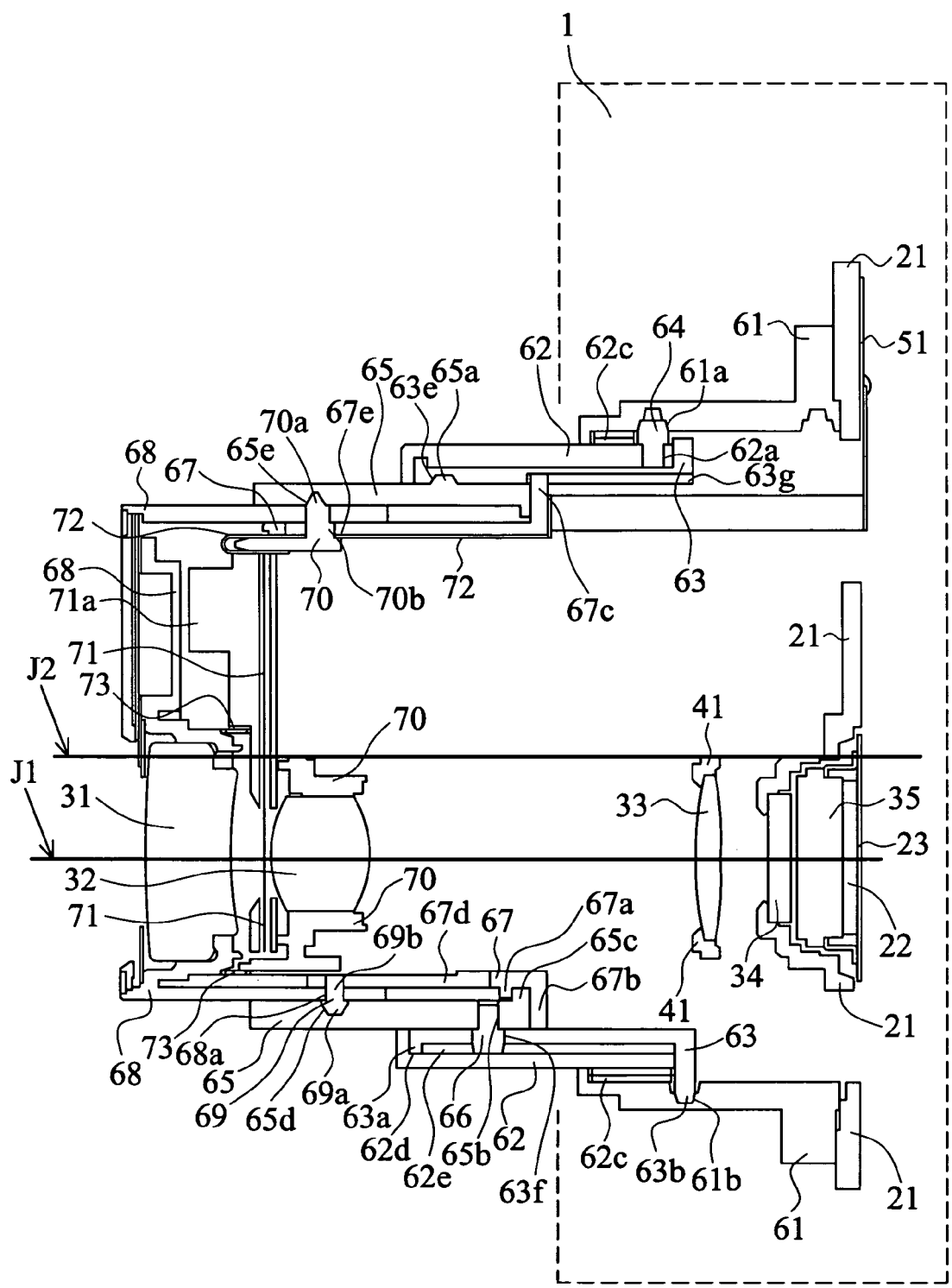
FIG. 20 is a cross section of a lens barrel in a minimum zoom of the photographing position.

When the zoom gear 83 rotates, and the rotary barrel 62 rotates, the cam follower pin 64 of the rotary barrel is moved from a position 61(4) of the cam groove of the fixing barrel 61, a full zoom of the photographic position, to a position 61(5). The cam groove of the fixing barrel 61 in this range is perpendicular to the optical axial direction. The rotary barrel is extended in the optical axial direction and rotated about the axis J2. The guiding barrel 63 is stopped. Meanwhile, the rotary barrel 62 and the guiding barrel 63 rotate relatively to each other such that the cam-follower 65a of the cam barrel 65 is moved from the position 63(4) to the position 63(5) of the cam groove of the guiding barrel 65. The cam barrel 65 and the guiding barrel rotate relatively to each other such that the cam-follower pin 69 of the first lens frame is moved from the position 65(4) to the position 65(5). The cam-follower 70a of the second lens frame 70 is guided from the position 65(14) to the position 65(15) of the cam barrel 65. Since the guiding barrel 63 is stopped, the first lens frame 68 for supporting the first lens group 31 and the second lens frame 70 for supporting the second lens group 32, move in and out in the optical axial direction, respectively, while rotating about the central axis J2. Each cam groove of the cam barrel 65 and the guiding barrel 63 is formed from the full zoom to the minimum zoom with various zooming distance therebetween. FIG. 20 is a cross section of a lens barrel 2 at the minimum zoom of photographing position.

When it is moved from the minimum zoom to the full zoom of the photographing position, the zoom gear 83 can rotate in an opposite direction. The control of the zoom motor 81 for driving the zoom gear 83 can obtain any focal distance. If it is moved from the full zoom to the housed position, the zoom gear can also rotate in an opposite direction to achieve a housed position, as shown in FIG. 13.

Figure 21:
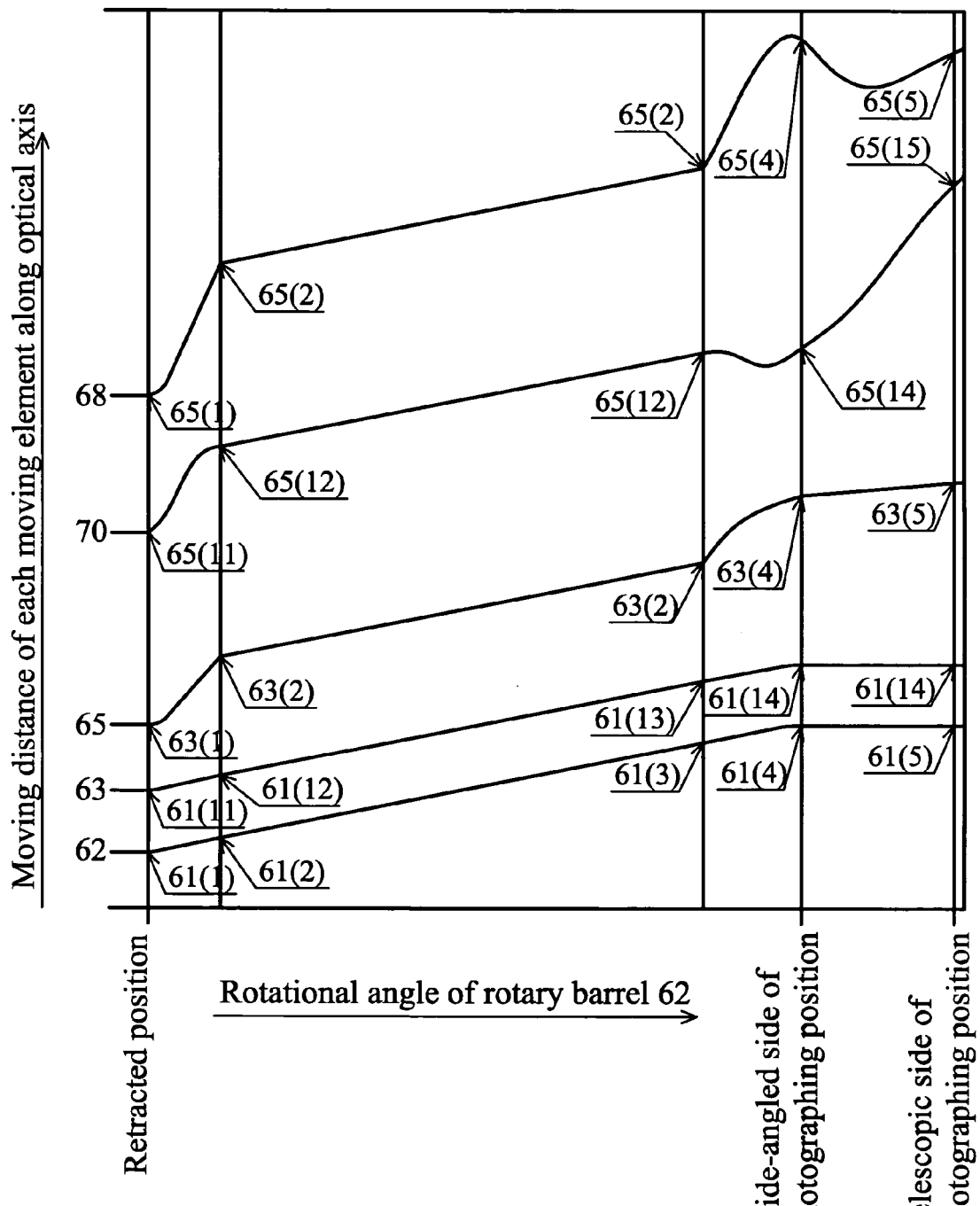
FIG. 21 is a relationship between the rotational angle of the rotary barrel and moving distance of each moving element along an optical axis.

FIG. 21 is a relationship between the rotational angle of the rotary barrel and the moving distance of each moving element along an optical axis. The horizontal axis represents the rotational angle of the rotary barrel 62. The vertical axis represents the absolute moving distance of the rotary barrel 62, the guiding barrel 63, the cam barrel 65, the first lens frame 68, and the second lens frame 70 in the optical axial direction. The positions of each moving element passing therethrough (as shown in FIGS. 17, 18, and 19) are shown in FIG. 21. Thus, the movement relationship of each element of the lens barrel 2 in the optical axial direction.

According to the described structure, the lens barrel 2 can be in a housed position (when the camera is idle), and the first lens group 31 and the second lens group 32 can be retracted to a lateral side of the third lens group 33, the low-pass filter 34, and the CCD 35 such that the size of the lens barrel 2 can be reduced. In the photographing position, the first lens group 31 and the second lens group 32 can move in the direction of the photographing optical axis J1 to a desired position and can also perform zooming.

Moreover, the first lens group 31 and the second lens group 32 are supported in an interior side of the guiding barrel 63 with a cylindrical shape. Thus, the deviation or relative tilt of the first lens group 31 and the second lens group 32 where optical performance influence is high can be reduced. Thus, the optical performance can be maintained in the photographing position.

Additionally, the zoom motor 81 is a drive source of the extending and retracting mechanism to rotate the rotary barrel 62. Thus, another retracting mechanism or other drive source for the first lens group 31 and the second lens group 32 can be eliminated. The structure of the lens barrel 2 can be simplified and miniaturized.

The invention is not limited to the above disclosure. There are other variations.

For example, the cam groove 61b, engaged with the cam-follower 63b of the guiding barrel 63 disposed in the fixing barrel 61, is deeper than the cam groove 61a, engaged with the cam-follower pin 62 of the rotary barrel. Conversely, the cam groove 61b can be shallower than the cam groove 61a.

Figure 22:
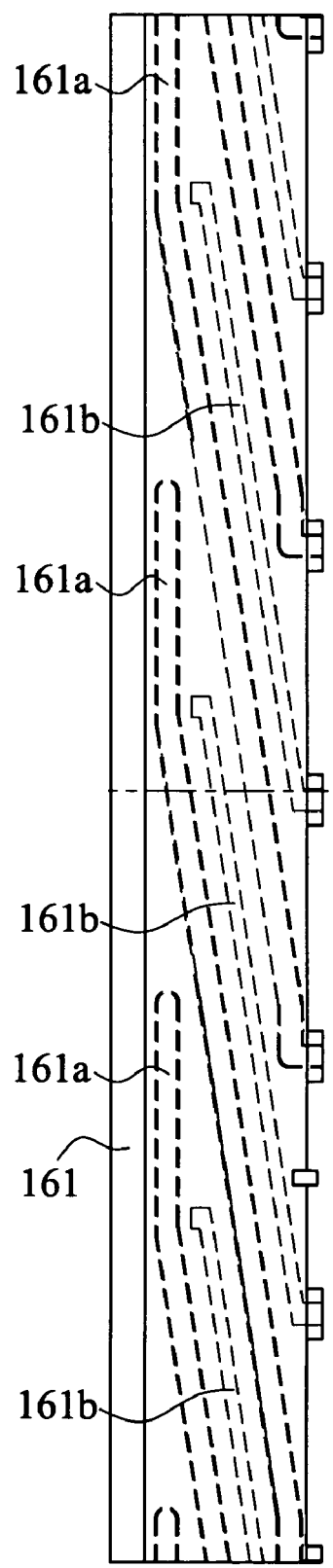
FIG. 22 is a development viewed from an outer circumference of a fixing barrel of another embodiment.
Figure 23:
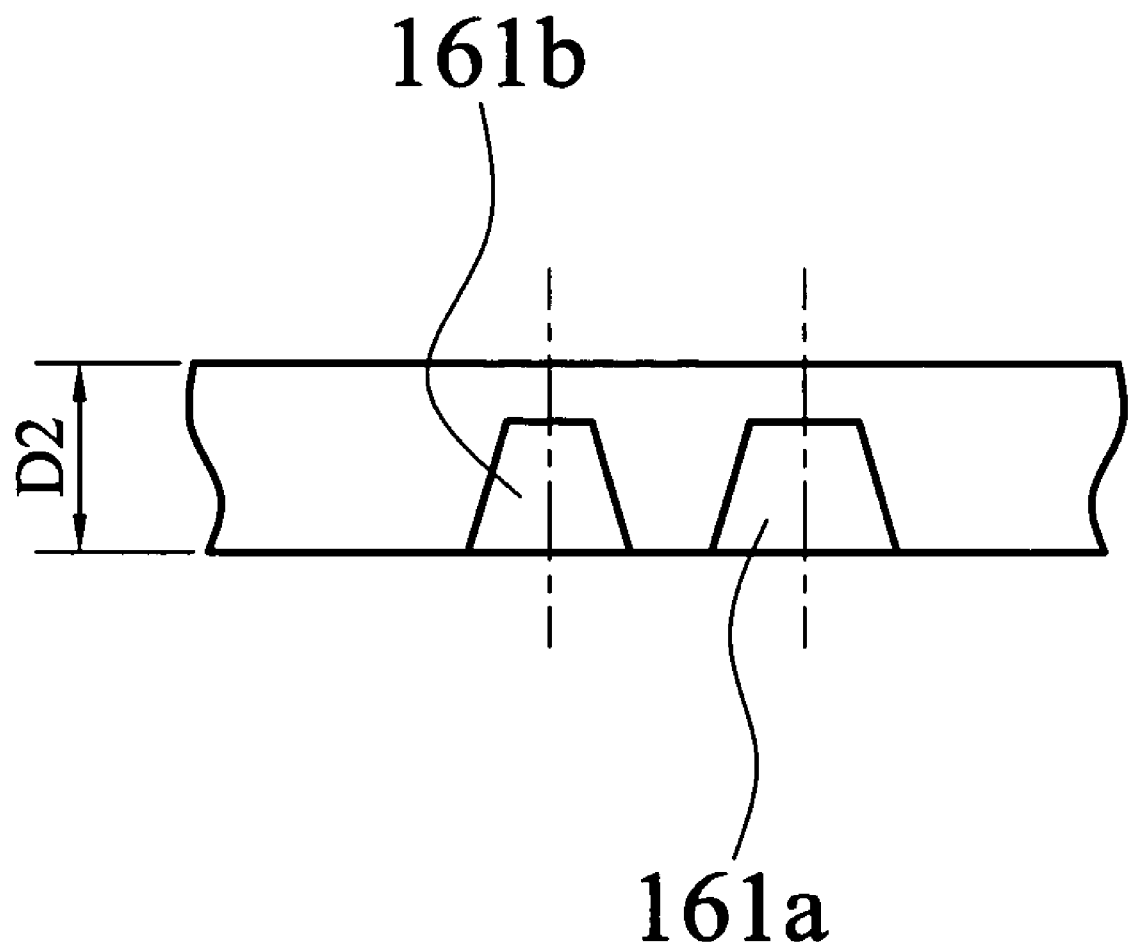
FIG. 23 is a cross section of a cam groove of the fixing barrel of FIG. 22.

Furthermore, the cam groove 61a, engaged with the cam-follower pin 64 of the rotary barrel in the fixing barrel 61, and the cam groove 61b, engaged with the cam-follower 63b of the guiding barrel 63, share the same cam locus region 61c. As shown in FIG. 22, however, the cam groove 161a, engaged with the rotary barrel's cam-follower pin 64 of the fixing barrel 161, and the cam groove 161b, engaged with the cam-follower 63b of the guiding barrel 63, are formed without intersecting each other. If the cam grooves 161a and 161b do not intersect each other, as shown in FIG. 23, the basic thickness D2 of the fixing barrel 161 with smaller outer circumference can be thinner than the basic thickness D1 of the fixing barrel 61 of the described embodiment. Thus, the size of the lens barrel 2 can be reduced.

Additionally, the position 61(1) to the position 61(4) of the cam groove 61a of the fixing barrel 61 and the position 61(12) to the position 61(13) of the cam groove 62b are at the same angle and linearly formed a certain amount of extending structure. The loci of the cam grooves 61a and 61b, however, can be freely determined, respectively, accordingly to curved lines. The relationship of moving amount of the rotary barrel 62 and the guiding barrel 63 in the optical axial direction and the rotational amount of the central axis J2 can be arbitrarily decided.

Moreover, the cam-follower pin 64 of the rotary barrel and the rotary barrel 62 are individually formed. However, they can also be formed integrally into a cam-follower. Similarly, that of the guiding barrel 63 can be integrally formed into a cam-follower, or the cam-follower and the guiding barrel 63 can be separately formed.

The quantities of the cam-follower pin 64, engaged with the cam groove of the fixing barrel 61 and the cam-follower 63b of the guiding barrel 63 are not limited to three. One or two or more than four are applicable.

The guiding barrel 63 indirectly maintains the first lens frame 68 and the second lens frame 70 for supporting the first lens group 31 and the second lens group 32 via the cam barrel 65 and the straight barrel 67. The cam barrel, however, can indirectly maintain the optical photography system by other elements. The guiding barrel 63 can also directly maintain the optical photography system.

The optical system of the lens barrel not necessarily comprises three lens groups, can also comprise one, two, or more than four lens groups. The lens groups maintained and retracted by the guiding barrel 63 are not limited to the first lens group 31 and the second lens group 32, and can be any lens group from the optical system.

The zoom lens barrel is applicable to any lens extending and retracting mechanism. Other lens barrel without zoom operation or single-focus lens barrel are also applicable. The single-focus lens barrel and the zoom lens barrel can be applied in the same place and retracted to provide a simplified structure.

The lens barrel of the invention provides lowered costs and minimizes the size thereof. Thus, it has potential market value and is applicable in any camera.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An extending and retracting mechanism of a lens barrel, for extending an optical photography system out of an electronic device and retracting the optical photography system therein, comprising:

a fixing barrel, comprising a first cam groove and a second cam groove formed on an inner circumference thereof;

a rotary barrel, comprising a first cam-follower formed on an outer circumference thereof and engaged with the first cam groove of the fixing barrel, rotating about a central axis parallel to an optical axis of the optical photography system;

a guiding barrel, comprising a second cam-follower formed on an outer circumference thereof and engaged with the second cam grooves of the fixing barrel, rotatably supporting a portion of the optical photography system with respect to the rotary barrel; and a driving mechanism, turning the rotary barrel such that the guiding barrel rotates about the central axis and moves along the central axis.

2. The extending and retracting mechanism of a lens barrel as claimed in claim 1, wherein the second cam groove has a first linear trench engaging the second cam-follower so as to move the guiding barrel along the central axis when the portion of the optical photography system is out of the optical axis.

3. The extending and retracting mechanism of a lens barrel as claimed in claim 1, wherein the second cam groove has a second linear trench engaging the second cam-follower so as to move the guiding barrel along the central axis when the portion of the optical photography system is positioned along the optical axis.

4. The extending and retracting mechanism of a lens barrel as claimed in claim 3, wherein the portion of the optical photography system is positioned along the optical axis so as to perform zooming by rotating the rotary barrel.

5. The extending and retracting mechanism of a lens barrel as claimed in claim 4, wherein the guiding barrel supports the portion of the optical photography system, and the optical photography system comprises a first lens group and a second lens group from the object side.

6. The extending and retracting mechanism of a lens barrel as claimed in claim 1, wherein the first and second cam grooves of the fixing barrel are formed without intersecting each other.

7. The extending and retracting mechanism of a lens barrel as claimed in claim 1, wherein the first and second cam grooves of the fixing barrel share the same cam loci and have different depths.

8. The extending and retracting mechanism of a lens barrel as claimed in claim 7, wherein the rotary barrel further comprises a protrusion, engaged with the first cam groove of the fixing barrel and disposed in the vicinity of the first cam-follower.

* * * * *